United States Patent
Decker et al.

(10) Patent No.: US 7,260,641 B2
(45) Date of Patent: Aug. 21, 2007

(54) METHOD FOR THE INTEGRATED TRANSMISSION OF FIRST DATA WITH REAL-TIME REQUIREMENT AND SECOND DATA WITHOUT REAL-TIME REQUIREMENT, COMMUNICATION DEVICE AND COMMUNICATIONS SYSTEM

(75) Inventors: Hendrik Decker, München (DE); Micheal Krautgärtner, München (DE)

(73) Assignee: Siemens Aktiengesellschaft, Munich (DE)

( * ) Notice: Subject to any disclaimer, the term of this patent is extended or adjusted under 35 U.S.C. 154(b) by 1120 days.

(21) Appl. No.: 09/829,792

(22) Filed: Apr. 10, 2001

(65) Prior Publication Data

US 2001/0038610 A1 Nov. 8, 2001

(30) Foreign Application Priority Data

Apr. 10, 2000 (DE) .............................. 100 17 766

(51) Int. Cl.
*G06F 15/16* (2006.01)
*G06F 15/173* (2006.01)

(52) U.S. Cl. .................. 709/233; 709/223; 709/231; 709/232

(58) Field of Classification Search ................ 709/220, 709/223, 227, 228, 229, 239, 231–233
See application file for complete search history.

(56) References Cited

U.S. PATENT DOCUMENTS

| | | | |
|---|---|---|---|
| 6,483,846 B1 * | 11/2002 | Huang et al. ................ 370/445 |
| 6,594,268 B1 * | 7/2003 | Aukia et al. ................. 370/400 |
| 6,608,832 B2 * | 8/2003 | Forslow ....................... 370/353 |
| 6,757,256 B1 * | 6/2004 | Anandakumar et al. .... 370/252 |

FOREIGN PATENT DOCUMENTS

EP 0 814 632 A2 12/1997

OTHER PUBLICATIONS

"PSTN and Internetworking (pint)", pp. 1-3, and a Memo from http://www.ietf.org/html.charters/pint-charter.html, pp. 1-59.
"Design of V/D-API and Architecture of the VE-MASE" (Carrega et al.), CEC Deliverable No. AC343/ Siemens / WP2 / DS / P / 02 / a1.
"Telecommunications and Internet Protocol Harmonization Over Networks (TIPHON); General aspects of Quality of Service (QoS)".
"Enabling QoS adaptation decisions for Internet applications" (Salem et al.), dated Oct. 16, 1998.
"Quality of Service Management in an Integrated Mobile Voice/ Data-Enabled Service Architecture" (Decker et al.).
Session Initiation Protocol (SIP), (Handley et al.), IETF Request for Comments 2543, Mar. 1999, as mentioned on p. 7 of the specification.
"Flexible Quality-of-Service Technology for Supporting Voice/ Data-Integrated Nomadic Networking" (Decker et al.), in Christensen-Dalsgaard, Donelly, and Griffith (eds).
"Wireless Application Protocol, Wireless Telephony Application Specification" Version Nov. 8, 1999, WAP WTA.

* cited by examiner

*Primary Examiner*—Ario Etienne
*Assistant Examiner*—Hussein El-chanti
(74) *Attorney, Agent, or Firm*—Laurence A. Greenberg; Werner H. Stemer; Ralph E. Locher

(57) ABSTRACT

A plurality of first quality of service classes is provided for transmitting first data and a plurality of second quality of service classes is provided for transmitting second data, in each case in the application layer. A combined quality of service class is selected from the combined quality of service classes formed from the first quality of service classes and the second quality of service classes. The first data and the second data are supplied to a unit of the transport layer, and the unit transmits the data in dependence on the transmission parameters allocated to the selected combined quality of service class.

12 Claims, 4 Drawing Sheets

FIG 4

| K | Voice Data | Text Data | Voice Data Delay | Voice Data Priority | MOS |
|---|---|---|---|---|---|
| 1.1 | 1 | CWB/MMC | limited | high | maximum |
| 1.2 | 2 | CWB/MMC | limited | high | high |
| 1.3 | 3 | CWB/MMC | limited | high | medium |
| 1.4 | 4 | CWB/MMC | limited | high | low |
| 2.1 | 1 | no text data | limited | high | maximum |
| 2.2 | 2 | no text data | limited | high | high |
| 2.3 | 3 | no text data | limited | high | medium |
| 2.4 | 4 | no text data | limited | high | low |
| 3 | 5 | CWB/MMC | unlimited | low | lowest acceptable |
| 4 | 5 | no text data | unlimited | low | lowest acceptable |
| 5 | no voice data | CWB/MMC | unlimited | no voice data | -- |
| 6 | no voice data | no text data | unlimited | no voice data | -- |

400

METHOD FOR THE INTEGRATED TRANSMISSION OF FIRST DATA WITH REAL-TIME REQUIREMENT AND SECOND DATA WITHOUT REAL-TIME REQUIREMENT, COMMUNICATION DEVICE AND COMMUNICATIONS SYSTEM

BACKGROUND OF THE INVENTION

Field of the Invention

The invention relates to a method for the integrated transmission of first data with real-time requirement and second data without real-time requirement, a communication device and a communications system.

The Open System Interconnection (OSI) layer model defined by the International Organization for Standardization (ISO) is described by A. S. Tanenbaum, Computer-Netzwerke [Computer Networks], Wolframs's Fachverlag, $2^{nd}$ Ed., ISBN 3-925328-79-3, p. 17-32, 1992. Within the OSI layer model, different tasks existing in a transmission of data between computers, generally a communication between computers in a heterogeneous communication network, are distributed over different layers which in each case provide predetermined services transparently, that is to say they are provided by a unit in the respective layer to a unit of a "layer above" in such a manner that the layers above cannot see how the respective service is provided but only that the respective service is provided.

In the OSI layer model, in particular, a distinction is made between layers which are responsible for the error-free transmission of data from one computer to another computer within the communication network and layers which use these services.

A layer which has the task of ensuring end-to-end communication from a transmitting computer to a receiving computer, is the so-called transport layer (layer 4 in the OSI layer model).

An example of a protocol of the transport layer is the Transport Control Protocol (TCP) which usually operates in conjunction with the Internet Protocol (IP) of the network layer (layer 3 of the OSI layer model). It is also known to provide in the IP a transmission of the data in accordance with different quality of service classes (COF for integrated services) at the level of the network layer.

A distinction must be made between the transport layer and, for example, the application layer (layer 7 in the OSI layer model), in which the transmission of data by means of a communication protocol is determined purely from the point of view of application and not from a point of view in which the individual transmission components are taken into consideration. To illustrate, the application layer usually contains the user program.

Examples of protocols in the application layer are the Hypertext Transfer Protocol (HTTP), the method according to a MPEG standard for coding video data and a method for transmitting still pictures, for example the method according to the JPEG standard. Furthermore, methods for coding voice data in accordance with the TIPHON standard (see ETSI TIPHON, Telecommunications and Internet Protocol Harmonization Over Networks, General Aspects of Quality of Service (QoS), TR 101 329 V2.1.1 (1999-06), June 1999) are defined in the application layer.

In the case of multimedia data to be transmitted, a distinction must be made between data to be transmitted in a case of which, in particular, a very high demand must be made that it can be guaranteed, that the delay time between the data is very short as is the case, for example, with voice data or video data. In the case of voice data, it is particularly important that the voice data transmitted are received at the receiving computer with very little delay since otherwise the quality of the received reconstructed voice data is considerably reduced for the user of the receiving computer who listens to the reconstructed voice data. In particular, such requirements will also be called real-time requirements of the data in the text which follows.

In contrast, a usual multimedia data stream also contains second data without real-time requirements, for example text data or also still-image data.

In the case of such data, it is only generally important that the data are transmitted as free of errors as possible but not necessarily that, for example, the delay of the transmission between the individual data elements is as short as possible.

It has been known to provide in each case a communication link for first data with real-time requirement and second data without real-time requirement. See, for example, IETF working group, PSTN and Internet Internetworking (pint), available on Apr. 2, 2000 at the URL address www.ietf.org/html.charters/pint-charter.html, and WAP: Wireless Telephony Application Specification, available on Apr. 2, 2000 at URL address ww1.wapforum.org/tech/documents/SPEC-WTA-19991108.pdf.

It must also be noted that, in the case of mobile communication terminals, it is usually often impossible or at least impractical to set up separate communication links for first data with real-time requirement and second data without real-time requirement over a number of mobile terminals as is provided in accordance with the prior art described in the above IETF working group publication. In the case of mobile communication terminals, in particular, this is attributable to the scarcity of resources of the mobile communication terminals and of the available bandwidth in a mobile radio network which is much less than in the case of a communications system in which only a landline network is provided.

To achieve further integration of the transmission of multimedia data, it is known from Krautgärtner and Decker, et al., in "Design of V/D-API and Architecture of the VE-MASE", CEC Deliverable Number AC343/Siemens/WP2/DS/P/02/a1, Project Number AC343, November 1998, to transmit first data with real-time requirement and second data without real-time requirement in an integrated manner from the point of view of the application layer in a communication link.

In the prior art communications system according to the MOVE architecture, the middleware VE-MASE (Voice Enabled Mobile Application Support Environment), as defined by Krautgärtner and Decker, which is installed in client computers which are located in a predetermined communication network, and in gateways which are used as switching computers between a wire-connected part and a wireless part of a communication network, and in mobile communication terminals such as, for example, a notebook, a Personal Digital Assistant (PDA) or also a mobile radio telephone with which communication is possible in accordance with the Wireless Access Protocol (WAP).

It is also known from the above ETSI TIPHON paper to divide first data with real-time requirements into different quality of service (QoS) classes. Each quality of service class of the first data is in each case allocated to a predetermined guaranteed quality of the reconstructed voice data, for example the delay to be guaranteed, the time for the connection set-up and other mechanisms for guaranteeing a predetermined quality of the voice signal.

Bhatti and Knight, in "Enabling QoS Adaptations for Internet Applications", Journal of Computer Networks, Vol. 31, No. 7, p. 669-92, March 1999, describe mapping the transmission of data from the application layer to the transport layer for only one type of data, namely for the first data with real-time requirement—voice data in the method described bz Bhatti and Knight. In particular, the choice of voice codec (coder and decoder) to be used, as a function of measured transmission parameters, that is to say the throughput, the jitter and the delay of the data to be transmitted, is described.

Furthermore, a general classification scheme at nontechnical level for first data with real-time requirement and second data without real-time requirement is known from Decker, Krautgärtner, Ong, and Wallbaum, in "Quality of Service Management in an Integrated Mobile Voice/Data-Enabled Service Architecture," Proceedings of the 4$^{th}$ ACTS Mobile Communication Summit, Jun. 8-11, 1999, Sorrento, Italy; and from Decker and Krautgärtner, "Flexible Quality-of-Service Technology for Supporting Voice/Data-Integrated Nomadic Networking," in Chistensen-Dalsgaard, Donelly, and Griffith (eds), Flexible Working—New Network Technologies, IOS Press/Ohmsha, 1999, ISBN 1 58603 028 0 (IOS Press), ISBN 4 274 90322 2 C3050 (Ohmsha), Library of Congress Card Number 99-67675.

The so-called Session Initiation Protocol (SIP) is known from Handley, et al., SIP: Session Initiation Protocol, IETF Request for Comments 2543, March 1999.

SUMMARY OF THE INVENTION

The invention is based on the object of providing a method of transmitting first data with real-time requirement and second data without real-time requirement in a simple manner, taking into consideration their requirement for the transmission quality, in the application layer in, from the point of view of the application layer, a single communication link. It is a further object to provide a corresponding communications system and a communications device.

With the above and other objects in view there is provided, in accordance with the invention, a method of transmitting data with real-time requirement and data without real-time requirement, which comprises:

providing a plurality of first quality of service classes in an application layer for transmitting first data with real-time requirement and a plurality of second quality of service classes in the application layer for transmitting second data without real-time requirement;

selecting a combined quality of service class formed from the first quality of service classes and the second quality of service classes in the application layer, each combined quality of service class being allocated transmission parameters specifying a transmission of the first data and the second data; and supplying the first data and the second data and the transmission parameters of the selected combined quality of service class to a unit of a transport layer, and transmitting the first data and the second data with the unit taking into consideration the transmission parameters.

In other words, in the method for transmitting first data with real-time requirement and second data without real-time requirement, a plurality of first quality of service classes is allocated to the first data at the level of the application layer for transmitting the first data. For transmitting the second data, a plurality of second quality of service classes is allocated to the second data at the level of the application layer. One of the combined quality of service classes formed from the first quality of service classes and the second quality of service classes is selected in the application layer, each combined quality of service class being allocated transmission parameters by means of which it is specified by means of which parameters the first data and the second data are to be transmitted. In particular, a prioritization of the transmission of the first data relative to the second data and conversely is provided in the transmission parameters of the respective combined quality of service classes. The first data and the second data and the transmission parameters of the selected combined quality of service class are supplied to a unit of the transport layer by means of which the first data and the second data are transmitted taking into consideration the transmission parameters.

The first data with real-time requirement are, for example, voice data in which the first quality of service classes according to TIPHON as described in the above-quoted ETSI TIPHON paper can be allocated. In addition, another additional quality of service class can be provided for further differentiation for improved adaptation of the quality of service classes from TIPHON to the requirements of the integrated transmission of data with real-time requirement and data without real-time requirement.

Furthermore, the first data can also contain video data, particularly data in accordance with the MPEG standard or a video telephone standard such as, for example, in accordance with the ITU-H.263 standard.

The second data without real-time requirement can be, for example, text data which are transmitted, for example, in accordance with the HTTP protocol or in accordance with the WAP protocol, or also still-image data, for example according to the JPEG standard.

The second quality of service classes can be predetermined in a similar manner to the first quality of service classes in accordance with the requirements set for the transmission of the first data and the resources of the transmission medium needed for guaranteeing the requirements.

From the first quality of service classes and the second quality of service classes, combined quality of service classes are formed from which a combined quality of service class is selected and the transmission parameters allocated to the respective selected combined quality of service class are supplied to the unit of the transport layer. The respective quality of service classes can be allocated in each case a priority which specifies the priority with which the respective data are to be transmitted. The combined quality of service classes can be formed as a function of the first priorities and the second priorities which are allocated to the first quality of service classes or, respectively, to the second quality of service classes.

The combined quality of service class can be selected in the following manner:

a) the combined quality of service class which has the first quality of service class with the highest first priority and the second quality of service class with the highest second priority is selected, b) a check is made whether a coder to be used can transmit the first data and the second data according to the transmission parameters of the respective combined quality of service class, c) if this is so, the combined quality of service class is selected, d) if this is not so, a further combined quality of service class is selected in such a manner that in each case the combined quality of service class with reduced second priority is selected, and e) steps b) and d) are performed iteratively until the coder can transmit the first data and the second data in accordance with the transmission parameters of the respective combined quality of service class.

In this manner, very simple heuristics are specified according to which the combined quality of service class can be selected. These simple heuristics are distinguished by their low requirement for computing time, especially in the case of mobile communication terminals, for example a mobile telephone, in which only relatively low computing capacity is available.

By comparison, heuristics based on statistical models known frequently from different optimization problems are much more computer-intensive and can scarcely be used in practice for a communication terminal having low available computing capacity.

In the transport layer unit, the first and the second data can be coded and transmitted as a data stream with predeterminable transport layer quality of service class.

A communication device, preferably a mobile communication device, has a processor which is set up in such a manner that the method steps described above can be performed.

Owing to its simplicity and the low requirements for the computing capacity needed, the method described above is very suitable, in particular, for a mobile communication device.

In a communications system, a mobile first communication device and a second communication device is provided. The first data and the second data are transmitted from the first communication device to the second communication device.

It must be noted that, in particular, voice data are very sensitive also to mobile-radio-related fluctuations in the bandwidth and the delay or the variance of the voice data to be transmitted.

A considerable advantage of the invention can be seen in the fact that, particularly in heterogeneous mobile radio networks, that is to say in mobile radio networks having different mobile radio subnetworks, for example an inexpensive proprietary mobile radio network of a university having a large available bandwidth and a public UMTS mobile radio network having a relatively little available bandwidth, an adaptation becomes necessary either of the end-to-end quality of the transmitted data directly in the communication terminal or during recoding from one voice/video codec to another one or during filtering of the data in the network on transmission from one mobile radio network to the other, which is also called handover.

The invention now makes it possible to adapt and to vary the transmission of the data at application protocol level on the basis of classifications which are predetermined for a user and are generally understandably, including currently measured QoS parameters such as, for example, the delay, the jitter and the available bandwidth, and to map it to real parameters describing the respective data stream and the transmission parameters, such as, for example, the parameters which describe the codec to be used for coding, the transmission formats used and/or the compression parameters for video data, image data or text data and to vary these as a function of application.

The invention is particularly suitable for use in internet telephony, for example in the field of so-called voice over IP (VOIP) or video over IP via communication links for transmitting data which are originally text data. One such possibility is, for example, provided exclusively as multimedia domain in mobile radio standard 3GPP Release 00 (UMTS).

Furthermore, a multiplicity of different voice codecs, generally codecs for data with real-time requirement and/or without real-time requirement can be stored either permanently in the communication terminals or can also be loaded temporarily into the communication terminal.

The invention also makes it possible to perform a quite specific prioritization of different information data streams and their adaptation depending on the requirements of a given application. Thus, it may be possible in an application that the data with real-time requirement are more important than data without real-time requirement. However, the case may also occur where the data without real-time requirement has to be given a higher priority in the data transmission than data with real-time requirement.

The invention makes it possible to specify this even at the level of the application layer.

According to the invention, it is also possible to respond quickly and flexibly to changing transmission conditions of the codec used or the communication network used, respectively, at application protocol level.

Thus, the quality of service of the combined voice services/data services can already be adapted a priori if there is knowledge about the available bandwidth being too little, for example during handover.

This leads to a further improvement in the total performance of the available communications system.

Other features which are considered as characteristic for the invention are set forth in the appended claims.

Although the invention is illustrated and described herein as embodied in a method for the integrated transmission of first data with real-time requirement and second data without real-time requirement, communication device and communications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a table listing the combined quality of service classes according to an exemplary embodiment of the invention.

DESCRIPTION OF THE PREFERRED EMBODIMENTS

Figure 2:
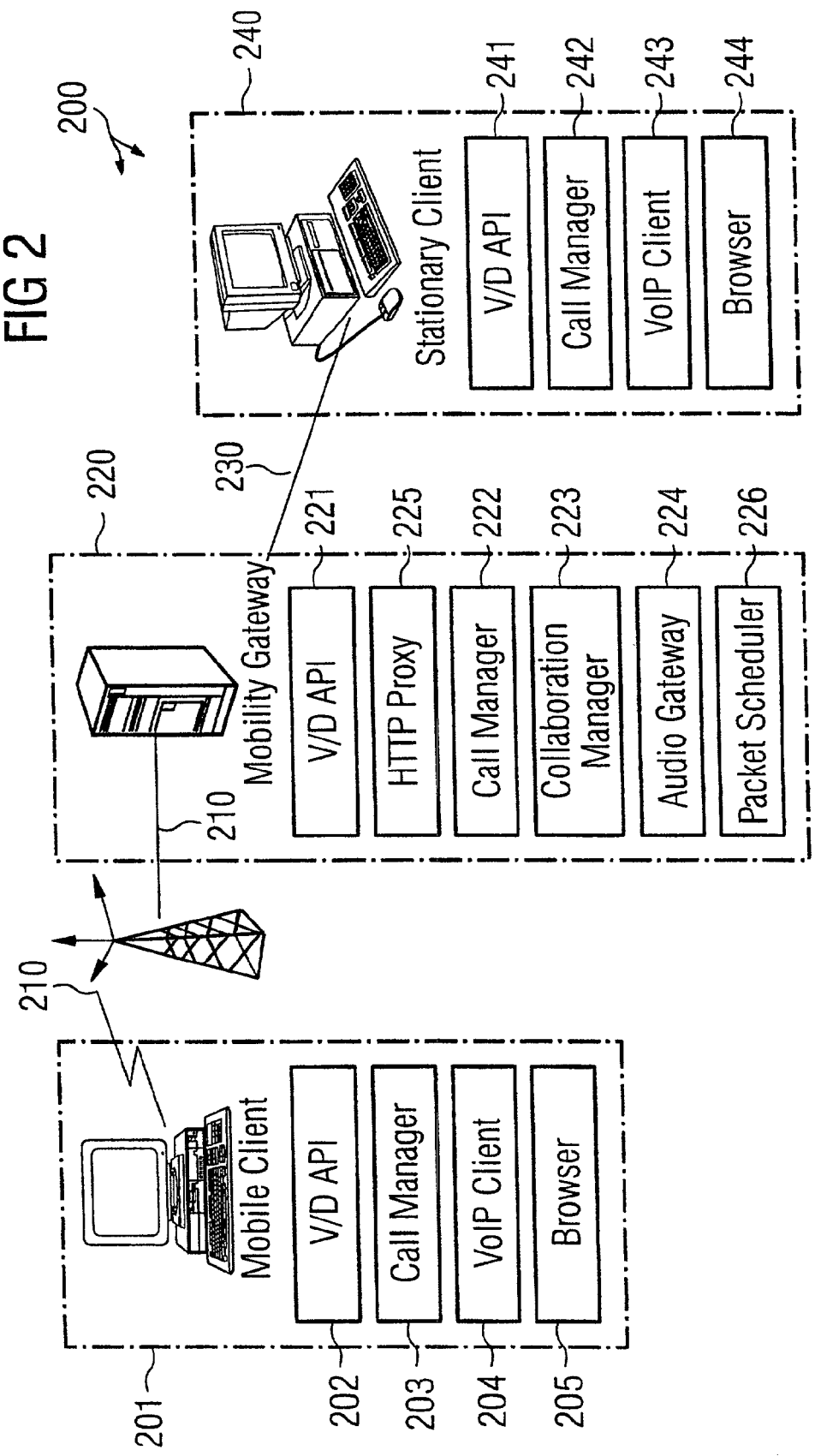
FIG. 2 is a block diagram showing the individual elements of a communications system according to the MOVE architecture as provided in the communications system according to the exemplary embodiment of the invention.

Referring now to the figures of the drawing in detail and first, particularly, to FIG. 2 thereof, there is seen a communications system 200 comprising a mobile communication device 201, a notebook, a PDA, or a WAP-capable mobile radio telephone according to the exemplary embodiment.

As is shown symbolically in FIG. 2, the mobile communciation device 201 has an input/output interface 202 and a communication call managing unit 203 (called call manager in the MOVE architecture).

Furthermore, a Voice over IP client 204 is installed in the mobile communication device 201.

Furthermore, a browser program 205 which can represent and code data according to the HTML format or the WML format is installed in the mobile communication device 201. In the Voice over IP client 204, the data are coded in accordance with the UDP/IP protocols in the transport layer or in the network layer according to the OSI layer model.

It is noted, in this context, that the Voice over IP client and the browser program act independently of one another.

The mobile communication device 201 is coupled to a switching computer 220 via a radio link 210, a radio link according to the UMTS standard according to the exemplary embodiment.

The radio link can be, for example, a connection in a wireless Local Area Network (wireless LAN), a connection according to the DECT, the GSM, or the UMTS.

The switching computer 220 also has an input/output interface 221, a call manager 222 and a communication link adaptation unit (collaboration manager) 223, an audio interface 224, a HTTP proxy unit and a scheduler 226.

Furthermore, a further computer is coupled as second communication device 240 to the switching computer 220 via a landline link 230.

A communication link is set up between the mobile communication device 201 and the second communication device 240 via the radio link 210, the switching computer 220 and the landline link 230 and communication takes place via the communication link setup.

The second communication device 240 also has an input/output interface 241 and a call manager 242. Furthermore, a Voice over IP client 243 and a browser program 244, which can communicate with the corresponding unit of the mobile communication device 201 in accordance with a predetermined protocol in the application layer or, respectively, the transport layer is installed in the second communication device 240.

Figure 3:
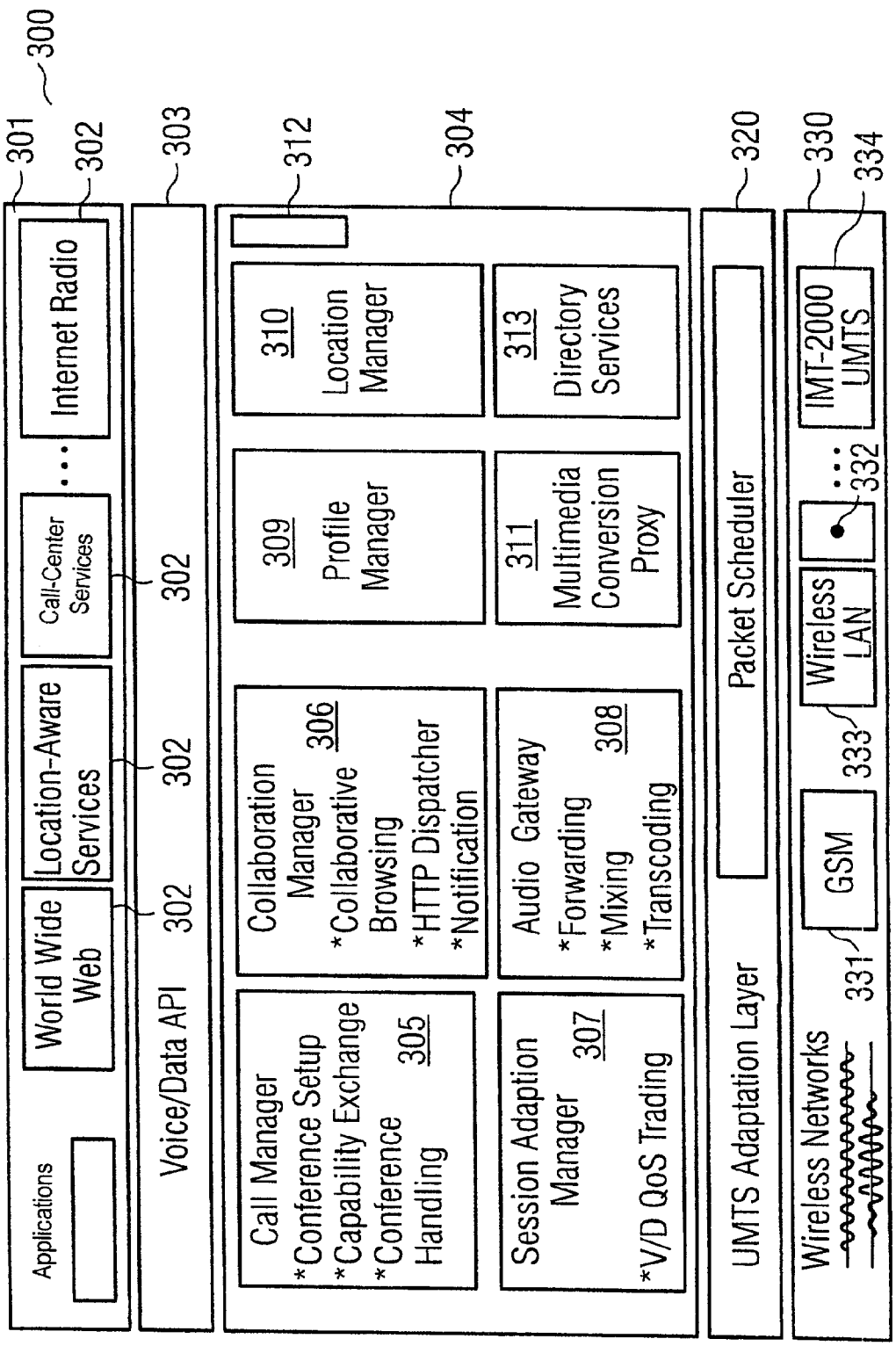
FIG. 3 is a block diagram illustrating the individual components of the VE-MASE middleware according to the MOVE architecture within a communication device as used in accordance with an exemplary embodiment of the invention.

The VE-MASE middleware of the MOVE architecture, described in the text which follows and shown in FIG. 3, is installed both in the communication devices 201, 240 and in the switching computer 220.

As will be described in the following text, the middleware ensures the following services:
- the transmission of data from and to the respective communication device in accordance with a HTTP protocol or the WAP protocol; and
- the transmission of audio data via a mobile radio network, guaranteeing both the recoding and the scheduling of real-time data and non-real-time data, that is to say of first data with real-time requirement and of second data without real-time requirement.

In the text which follows, some components of the devices according to the MOVE architecture described and defined in detail in the above-mentioned article by Krautgärtner and Decker, et al., Design of V/D-API and Architecture of the VE-MASE, CEC Deliverable Number AC343, will be explained in an overview.

The audio gateway provides the service of a real-time audio conference between units which communicate via a mobile radio link and units which communicate with one another in a landline network and units which are located within a landline network and communicate via a landline network link.

The audio gateway adapts first data, that is to say audio data in this case, especially voice data, in accordance with changing requirements by means of changed codecs and their parameters, by noise suppression and by recoding the respective data streams.

The scheduler according to the exemplary embodiment of the invention ensures that the first data with real-time requirement, that is to say the voice data and the video data, are not delayed by second data without real-time requirement, for example text data such as data according to the HTML format or electronic mail, audio data usually being assigned higher priority than video data in the transmission.

Data packets arriving at the scheduler are divided in accordance with their quality of service class allocated to the respective data packet.

Furthermore, the scheduler measures quality of service parameters for each data stream and the results of the measurement are supplied to the collaboration manager 223.

The call manager is distributed over the communication devices connected within the communications system 2000.

The call manager is responsible for
- setting up a communication link;
- controlling the communication link; and
- ending the communication link in which both first data with real-time requirement and second data without real-time requirement are exchanged between the mobile communication device 201 and the second communication device 240.

The call manager 203 is set up in such a manner that the Session Initiation Protocol SIP is implemented as described in the above-quoted M. Handley et al., SIP: Session Initiation Protocol, IETF Request for Comments 2543, March 1999.

The HTTP proxy maps data according to the HTML format to the requirements or capabilities corresponding to the respective communication device to which the data are to be sent. Thus, the HTTP proxy 225 suppresses color information, if necessary, that is to say color images are mapped onto black/white images if the receiver device can only display black/white images. Furthermore, different scalings and resolutions of the information can be changed or even complete video data or image data are filtered out, for example on transition from an HTML data format to a WML data format.

Further details can be found in the description of the MOVE architecture as defined in Krautgärtner and Decker, et al., Design of V/D-API and Architecture of the VE-MASE, CEC Deliverable Number AC343.

FIG. 3 shows an overview of the individual elements and their symbolic arrangement within the layer model for a communication device.

The individual application programs 302, for example the worldwide web browser, various call center services or also, for example, a program for performing Internet radio, are stored in the application layer 301 of the communication device 300.

A voice/data interface 303 and a mobile radio interface 304 are provided in accordance with the VE-MASE architecture as described in Krautgärtner and Decker, et al., Design of V/D-API and Architecture of the VE-MASE, CEC Deliverable Number AC343.

The following components are provided in the application layer 301 the call manager 305 for setting up and managing a communication link, a collaboration manager 306 for managing the web data streams,
the session adaptation manager 307, and
the audio gateway 308.

The following components are provided in the mobile radio interface 304:

a profile manager 309 for managing the profiles of the possible communication partners,
a location manager 310,
a multimedia conversion unit 311,
a user manager 312,
a directory services unit 313,
an event manager 314.

The units of the application layer 301 are coupled to units of a UMTS application layer 320.

The units of the UMTS adaptation layer 320 are coupled to different mobile radio networks 330, the units of the UMTS adaptation layer being set up in such a manner that the data of the application layer 301 are appropriately mapped to the required formats which are required for transmission depending on the (mobile) radio data format used.

The (mobile) radio protocol used can be, for example, the protocol according to GSM standard 331, or also the protocol according to the wireless transmission protocol DECT 332 or the protocol according to the wireless LAN 333 or also the protocol according to IMT 2000 UMTS 334.

In the text which follows, an overview of the functionality of the session adaptation manager 307 is given.

The session adaptation manager 307 selects one of various available communication networks, that is to say various wireless communication links used according to different transmission protocols, in such a manner that the selected communication network meets predetermined quality of service requirements, for example an available bandwidth or also a predetermined price of a communication link, that is to say a predetermined tariff.

The session adaptation manager 307 can generate signals by means of which the manner is specified in which data to be transmitted are compressed, converted, transcoded or even individual multimedia objects, for example individual images or videos, are filtered out before transmission.

If, for example, image data or video data are intended to be transmitted to a communication device which can display only image data or video data in black/white, data representing color information are removed in accordance with the control signals of the session adaptation manager 307 as a result of which the bandwidth needed is reduced.

In general, the session adaptation manager 307 selects, as will be explained in greater detail in the text which follows, a combined quality of service class which establishes transmission parameters by means of which the data to be transmitted are transmitted taking into consideration the boundary conditions determined by the transmission parameters.

Thus, for example if the available bandwidth is reduced in a wireless communication link, for example due to changed selection of a codex for coding audio data, by requesting a reduction in the magnitude of HTML data at the multimedia conversion proxy, by suppressing voice transmission, by suppressing the possibility of exchanging data in accordance with the HTTP protocol or the WAP protocol, an adaptation of the available transmission resources in the application layer to the requirements of the data to be transmitted is achieved.

Furthermore, it is assumed that first data with real-time requirement, voice data according to the exemplary embodiment, and second data without real-time requirement, text data according to the exemplary embodiment which are coded, for example, in accordance with the ASCII format, are to be transmitted by the mobile communication device 300.

The following five quality of service classes are allocated to the voice data, that is to say to the first data:

I. Quality of Service Class 5 (Least Acceptable Quality):
   according to the first quality of service class, a communication link is guaranteed which is provided in accordance with the available transmission resources. According to the first quality of service class, delays of the voice signal can occur at the receiver during the transmission of the voice data. With a high network load, delays can occur which lead to the quality of the transmitted voice data being below a usual quality of transmitted voice data in a cellular mobile radio network which is usually guaranteed.

II. Quality of Service Class 4 (Low Quality):
   according to a second quality of service class, a somewhat improved quality of the transmitted voice data is guaranteed.

III. Quality of Service Class 3 (Medium Quality):
   a medium quality of the transmitted voice data is guaranteed according to a third quality of service class, the medium quality essentially corresponding to the quality of a usual wireless mobile radio network. The quality is guaranteed, for example, by means of a communication link via a usual IP communication link.

IV. Quality of Service Class 2 (High Quality):
   according to a fourth quality of service class, a quality of the voice data to be transmitted is guaranteed which corresponds to that of a usual landline network telephone connection having a slightly delayed, that is to say increased delay of the voice data.

V. Quality of Service Class 1 (Maximum quality):
   a fifth quality of service class demands the transmission of the voice data in maximum quality which can be guaranteed at all according to the communication network to be used. The quality is at least as good as the quality of a usual landline network telephone link.

As described in the above-quoted ETSI TIPHON reference, the quality of the voice data can be categorized by means of a so-called "Mean Opinion Score" (MOS) which reproduces a subjective sensation of quality by a multiplicity of test persons of the voice data represented.

The quality scale of the MOS is between a value 1, which describes an unacceptable quality of the voice signal, and a value 5, which represents an excellent quality of voice data.

A usual telephone codec achieves an MOS of approximately 4.0.

The first quality of service classes described above are shown in the table below in an overview with the MOS to be achieved in each case.

The table also specifies for each first quality of service class the mean delay time which must be guaranteed, calculated from the time at which the speaker is speaking the voice signal and the time at which the transmitted reconstructed voice signal is output by the receiver device, called mouth-to-ear delay in the table.

Furthermore, a maximum period is specified which is allowed to be needed for setting up the connection of the communication link, called call set-up in the table.

|  | Maximum 1 | High 2 | Medium 3 | Low 4 | Least acceptable 5 |
|---|---|---|---|---|---|
| MOS quality | 4.2–5.0 | 3.4–4.2 | 2.6–3.4 | 1.8–2.6 | 1.0–1.8 |
| Mouth-to-ear delay | 0–150 ms | 150–250 | 250–350 | 350–500 | ≧500 ms |
| Call set-up | 0–1 sec | 1–3 sec | 3–5 sec | 5–10 sec | ≧10 sec |

The quality of service classes allocated to the first data will be called first quality of service classes in the text which follows.

The second data without real-time requirement, that is to say the text data, are also allocated quality of service classes which will be called second quality of service classes in the text which follows.

The second quality of service classes differ with respect to the error probability to be guaranteed which is allowed to occur at a maximum in a communication link.

The text which follows is based on the assumption of four second quality of service classes.

The case that second data can and are to be transmitted (CWB/MMC) can be refined further into the following conversion forms for image data:

i) there is no color conversion (color quality of the transmitted image information of the transmitter arrives unchanged at the receiver);
ii) polychromatic image to four colors (a wide color spectrum is mapped onto a coarse raster);
iii) colors, i.e. color information is mapped onto gray scale steps;
iv) colors or gray scale values of the color information are mapped onto black/white information (such as, e.g. when mapping HTML images onto images which are shown according to the WAP standard on a WAP mobile).

Bandwidth fluctuations can be compensated for by refined degradations in the spectrum of possible quality steps in the color conversion (generally the multimedia conversion).

Orthogonally to the color, the graininess (image resolution) or the image size, for example, can also be scaled. Scalings in the sense of magnifications or reductions in size are possible and are implemented by means of various MMC (Multimedia Conversion) modes.

In this case, too, the following applies: the finer the resolution or the larger the transmitted image, the more bandwidth is required.

Thus, in this case, too, a transmission capacity fluctuation can be compensated for by adapting the quality of multimedia conversion.

In summary, it can be said that classes 1.x, 3 and 5 in FIG. 4 can be refined in accordance with various multimedia dimensions such as chromaticity, granularity, size etc., in any combinations.

FIG. 4 shows a table 500 in which individual combined quality of service classes are shown which are the result of combining the individual first quality of service classes and second quality of service classes.

As can be seen in FIG. 4, a distinction can be made in three categories with respect to the voice data according to the exemplary embodiment.

In a first category, it is assumed that the respective second quality of service class can be guaranteed during a communication link, the predetermined delay time of the received voice data never being exceeded.

In a second category, it is only possible to guarantee the first quality of service class of lowest quality.

In a third category, it is specified that no voice data can be transmitted via the communications network.

The first category is identified by numbers 1 to 4 in the "voice" column in FIG. 4, the second case is identified by the number 5 and the third case is identified by the expression "no voice data."

Furthermore, a distinction is made in combined quality of service classes K whether text data, that is to say second data without real-time requirements, also need to be transmitted.

This distinction is shown in the "text data" column of FIG. 4.

If second data without real-time requirement are to be transmitted, this is marked by "CWB/MMC" (Collaborative Web Browsing/Multimedia Conversion) in the "text data" column of table 400.

This provides a statement of the purpose for which non-real-time data, i.e. second data, are typically transmitted at all and how they are transmitted, namely, for example, for the purpose of joint (collaborative) viewing and processing of image data, with the aid of conversion techniques for multimedia data (for instance conversion from color to gray scale representation or masking out of sounds or moving applets in HTML documents if necessary).

If no second data are to be transmitted in a communication link, this is specified by the expression "no text data" in table 400.

If first data and/or second data are transmitted by the communication device, the session adaptation manager 307 selects a combined quality of service class K of the combined quality of service classes K shown in FIG. 4.

The selection is made cyclically at a time interval of some seconds by the session adaptation manager 307.

In each cycle described in the text which follows, a codec optimized with regard to the combined quality of service class K and the available bandwidth is determined for coding the first data and the second data which uses the currently available bandwidth as well as possible and provides for an optimized transmission rate.

The selection is made as a function of different quality of service parameters which, according to the exemplary embodiment, can be essentially divided into three classes from which the optimized codec is determined:

A first class of quality of service parameters are profile parameters, that is to say quality of service parameters, those of the users of the communication terminals, the communication terminals themselves or characteristic data determined by or dependent on the respective application. Examples of such profile parameters are priorities for the relative preferential treatment for the first data with real-time requirement or second data without real-time requirement, information on the discrimination against or equal treatment of first data with real-time requirement and second data without real-time requirement, information on a possible necessity for converting multimedia data, for example information on the reduction of HiFi quality of audio data for lower-quality loudspeakers or headphones, the conversion of color information to brightness information, that is to say to gray scale values for black/white screens, information on maximum tolerable delay values of the received data, that is to say of the data to be transmitted, etc. Profile parameters can also contain other boundary conditions, for example user-definable parameters, application-dependent parameters or defaults which are caused by the communication terminal itself such as, for example, negotiated tariffs which are tied to certain maximum guaranteed quality of service classes.

Other quality of service parameters can be parameters which are stored for the duration of one cycle, have been reinitialized in a new cycle, or quality of service parameter values which have been valid for some preceding cycles. Examples of such quality of service parameters are, in particular, the stored type of the communication network which is used in the communication link, for example GSM, DECT, HSCSD, wireless LAN etc., and the values of the codec used, which were determined in the preceding cycle in time, of the transmission rates and loss rates of data packets in the communication link.

Other quality of service parameters can be parameters of a communication link measured by the audio gateway, for example current values of available currently determined bandwidths in communication links to local and remote network nodes, that is to say switching computers, and also local and remote jitter values and delay values in the transmission of data by the corresponding communication link, and an average length of information stream backlog, etc.

Figure 1:
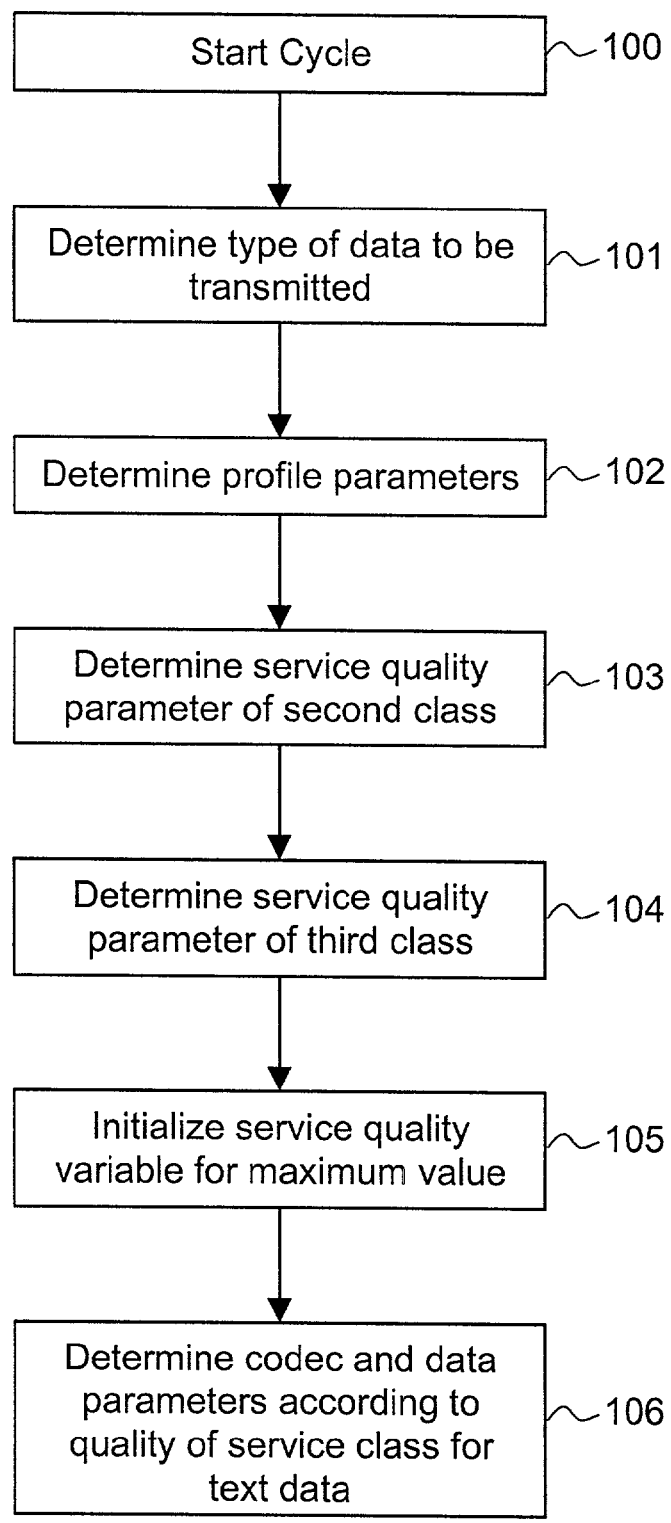
FIG. 1 is a flowchart in which the individual method steps according to the invention are shown in accordance with an exemplary embodiment of the invention.

In the text which follows, the method according to the exemplary embodiment of the invention for selecting a combined quality of service class K is explained in detail with reference to the flowchart of FIG. 1.

The cycle is started in a first step (step 100).

The type of data to be transmitted is determined in a further step (step 101).

Furthermore, it is assumed that first data with real-time requirement and second data without real-time requirement are to be transmitted in the communication link.

In a further step (step 102), the current profile parameters of the mobile communication device, among them the desired priorities allocated to the first data or the second data, respectively, are determined for an unambiguously identifiable communication link in which two or a multiplicity of communication terminals can communicate with one another, of which at least one communication device is a mobile communication device.

In a further step (step 103), the quality of service parameters of the second class shown above are read in, among these the type of communication network used in the communication link, previously stored quality of service features, the local codec previously used in the preceding cycle, which is described by means of coding parameters, the codec of the remote communication partner, that is to say of the respective remote communication device, used in the preceding cycle, the stored local loss rate, and the stored loss rate of the remote communication partner in the context of the preceding cycle.

In a further step (step 104), the quality of service parameters in class three shown above, provided, for example, by the audio gateway, are determined, that is to say, for example, the type of multimedia conversion if this is dynamic, the available delay values, the threshold values etc.

In a further step (step 105), a quality of service variable tryQoS is initialized with a maximum value.

The quality of service variable tryQoS is a value which is shown in the left-hand column in FIG. 4 for identifying the combined quality of service class K.

According to the heuristics used in accordance with the exemplary embodiment, the quality of service variable tryQoS is initialized, on a trial bases, with as high a value as possible as a function of the current profile parameters read in.

As will be described in the text which follows, the value of the quality of service variable tryQoS is gradually reduced if, according to all other current quality of service parameters, there is no suitable codec which guarantees the requirements of the current combined quality of service class K, until a suitable codec has been determined or until all available codecs have been unsuccessfully tried.

Naturally, it is possible that there can be a number of suitable codecs for each combined quality of service class depending on whether the corresponding codecs are implemented in the communication device.

As long as no suitable codec has yet been determined (while loop 106), the following method is performed:

In a first step, a check is made whether the quality of service variable is $\geq 1.1$ and is $\leq 4$. This corresponds to the case that a transmission of voice data, generally of first data with real-time requirement, is possible at all.

In the text which follows, it is determined, for all available codecs i which perform a transmission according to the combined quality of service class designated by the quality of service variable tryQoS, whether the respective codec i can provide the requested services.

If this is so, the method finds suitable codecs. The codecs, together with the frames per IP data packet belonging to the codec i, are stored in a list and a check is made whether the bandwidth required by the respective codec i is available depending on the available bandwidth. After that, a list of possible data parameter sets (e.g. according to the quality of service class for image data) is determined in accordance with the resultant bandwidth for data and personal preferences of the user.

After that, the respective optimum combination is selected from the two lists (codec, image data parameters) in a further step.

In the case of the combined quality of service classes K 1.X (high voice data priority relative to the image data), the codec i having the highest voice quality (described by the parameter MOS according to the present exemplary embodiment) and the lowest number of frames per IP data packet which is compatible with the bandwidth is selected.

For the image data, a conversion arrangement is selected as a function of the resultant bandwidths. If this is very narrow, the images are only converted in accordance with class iv) of colors or gray scale values to black/white image information.

In the case of the combined quality of service class K 3 (low voice data priority relative to the image data), the codec i having the lowest voice quality and the highest number of frames per IP data packet which is compatible with the bandwidth is selected. The image data are transmitted in the best possible quality.

For quality of service class K 2.x and 4 (no image data), only the codec and its parameters are optimized.

If it is not possible to determine for the respective quality of service variable a codec which can guarantee the combined quality of service class, i.e. the corresponding requirements, taking into consideration the available bandwidth, the value of the quality of service variable tryQoS is reduced in accordance with the following order of combined quality of service classes to be investigated:

1.1→1.2→1.3→1.4→3→5 or, respectively, 2.1→2.2→2.3→2.4→4→6.

These heuristics, which determine the order of the combined quality of service classes to be investigated, graphically mean that a check whether there is sufficient bandwidth available for the respective codec is made in each case for a combined quality of service class beginning with the best combined quality of service class having the maximum requirement for bandwidth.

If this is not so, a combined quality of service class which is in each case worse by one class is selected and a check is made whether a codec is available for this combined quality of service class and whether sufficient bandwidth can be provided for this codec by the communication network.

This procedure is performed until a codec is determined which guarantees both the respective current combined quality of service class and has a requirement for bandwidth which can be actually provided in the communication link by the communications network.

If such a codec has been determined, the codec, that is to say the parameters which describe the transfer characteristic of the codec, is stored and the transmission parameters are supplied to a unit of the transport layer which code data in accordance with the TCP.

If, however, it is not possible to transmit voice data via the communication network, a check is made whether the quality of service variable has the value 5, that is to say whether voice data are to be transmitted at all.

If this is so, the transmission parameters are stored as new, current values in accordance with the combined quality of service class 5.

If this is not so, the values which are allocated to the combined quality of service class 6 are stored as new transmission parameters.

In summary, the cycle of the method according to this exemplary embodiment can be subdivided into three phases which will be graphically described in the text which follows.

In a first phase, every available codec is checked whether it can be used at all for transmitting the desired data on the basis of the currently available bandwidth.

If this is so, an optimum LFP (Local Frames per Packet) parameter value is determined for this codec as a function of the conflicting parameters delay and available bandwidth. In this first phase, a set of suitable optimally parameterized codecs is thus determined for the transmission of the first data, in the form of pairs (codec, LFP).

In a second phase, each pair (codec, LFP) determined as suitable in the first phase is checked to see what quality of second data it permits at a maximum. The quality of second data is quantified in the form of so-called multimedia conversion parameters.

Thus, the degrees of quality of chromaticity, granularity and image size are determined which are appropriate for a given pair (codec, LFP) according to the current situations (available bandwidth, user profile, negotiated session parameters etc.) and can be made available.

These values are combined in an MMC vector. As a result of the second phase, a set of suitable triples (codec, LFP, mmc_vector) is thus obtained.

The vector mmc_vector designates a vector of QoS parameters. It represents an optimum point for the transmission in the space of transmission quality classes for the second data spanned by the dimensions of chromaticity, granularity, image size etc.

In a third phase, the relatively best parameter set (code, LFP, mmc_vector) is then determined from the set of all triples determined in the second phase by means of the current QoS measurement values and QoS presettings.

The relatively best parameter set determined in this manner is converted, i.e. used in the current transmission operation and the next cycle can begin.

In the text which follows, the method for selecting the combined quality of service class in the form of a pseudocode which is based on the syntax of the programming language C++, is shown:

```
procedure AQuaVIT (String CONF_ID)
/*   CONF_ID is input parameter. CONF_ID contains an
     unambiguous designator for a particular conference (occasionally
     also called "session"). A conference involves two or more end
     subscribers, at least one of which is mobile. Its terminal is
     typically a laptop, notebook or palmtop but, in principle, can
     also be an internet-capable mobile telephone. Other conference
     members are either also mobile or communicate via a voice/data-
     enabled terminal with a permanently networked Internet access.
*/
{
   //In next three get-statements, the main input data for AQuaVIT
   are obtained.
   get(CONF_ID, Profile_Params);
   /* Fetching current profile parameters of the mobile end sub-
   scriber, among these priority factors for voice and data streams,
   etc. */
   get(CONF_ID, Stored_Params);
   /* Fetching stored QoS parameter values existing since the
   previous cycle, among these also stored_NetworkType, etc. */
   get(CONF_ID, AudioGwy_Params);
   /* Fetching current QoS parameters supplied by audio gateway,
   e.g. type of multimedia conversion (if dynamic), delay values,
   threshold values, packet loss rates, etc. */
   boolean codecFound = false; // initialization of stop condition for
   white loop below
   int tryQOS;
   /* tryQoS is a QoS value according to column 1 in table 2 of the
   paper to be published. tryQoS is initialized with as high a value
   as possible on a trial basis in the next statement, as a function of
   the current profile parameters. This value will be gradually
   lowered later if, according to all other current QoS parameters,
   there is no suitable codec which makes it possible to have this
   QoS stage, until a suitable codec has been found or until all
   available codecs have been unsuccessfully tried. It must also be
   noted that there can be a number of suitable codecs for each QoS
   stage and that each suitable one among the available ones is also
   identified by AQuaVIT. At the end, the one whose actually
   best one will be selected among all suitable codecs which can
   guarantee the highest possible QoS stage. */
   /* Next, initialize tryQoS with conceivably highest value, depending
   on current QoS parameter in profile of mobile client */
   initialize(tryQoS, Profile_Params); // tryQoS is initialized, depending
   on QoS parameters in Profile
   /* The while loop below attempts to find, for a tryQoS value which is
   initially as high as possible, a set of feasible codecs with correlated
   LFP (Local Frames per Packet) value. Each pair of a feasible codec
   and corresponding LFP value is entered into a set. The loop iterates
```

-continued

```
by degrading the value of tryQoS if no feasible codec has been found,
and terminates if either a feasible codec has been found or none could
be found at all. */
while (!codecFound) // codecFound is initialized by default to false
{
    if (tryQoS ≧ 1.1&&tryQoS ≦ 4) // i.e., voice transmission is
    possible
    {
        */ The for-loop below checks, for each codec with index i
        (1 ≦ i ≦ numberOfavailableCodecs), if codec[i] is possibly
        feasible for tryQoS. If yes, then the most suitable LFP value
        corresponding to codec[i] is computed, and the pair
        (codec[i], LFP) is entered into the set of feasible pairs.
        Technically speaking, the QoS is the better the less frames
        per packet are used. But the less frames are used, the more
        bandwidth is needed (headeroverhead). */
        // first, initialize set of feasible pairs (codec, LFP) with the
        empty set
        set_of_feasible_pairs = empty_set;
        // in for-loop below, each feasible pair (codec[i], LFP) is
        entered into this set
        for (int i=0; i < numberOfavailableCodecs; i++)
        {
        /* Following if-cascade determines the optimal LFP
        parameter value for codec[i].
        Recall: The more frames there are per packet, the less
        bandwidth is required but the higher the resulting delay is,
        i.e. the lower the resulting voice quality is. (Memo: in the
        commentary, the following if-cascade is called "first
        pass".)*/
        if possibly_feasible(codec[i], Profile_params,
        Stored_Params, AudioGwy_Params)
        {
            bestLFP = compute_best_LFP(codec[i], Delay,
            Bandwidth);
            /* Compute best possible value of LFP for codec[i],
            depending on the Delay caused by LFP and the
            Bandwidth required by LFP. */
            set_of_feasible_pairs = set_of_feasible_pairs ∪
            {(codec[i], bestLFP)};
            // store the pair (codec[i], bestLFP) in set of feasible
            pairs
        }
        if !is_empty(set_of_feasible_pairs) // negation (!) of
        is_empty returns boolean value
        {
        codecFound = true;
        }
        } //end for (int i = 1; i < numberOfavailableCodecs; i++)
        if (!codecFound)
        // memo: this is still the 'voice allowed' case, i.e.
        tryQoS > = 1.1 && tryQoS < = 4
        {
            decrement(tryQoS);
            // decrementation of QoS value is as described in paper:
            // 1.1 => 1.2 => 1.3 => 1.4 => 3 => 5 and
            2.1 => 2.2 => 2.3 => 2.4 => 4 => 6
        }
        else // if codecFound = true
        /* Memo: This else block contains the phases called
        "second pass" and "third pass" in the above commentary. */
        {
            set_of_feasible_triples = empty_set // initialisation
            //* for each feasible pair (codec[i], bestLFP), compute
            a feasible vector of parameters for multimedia conver-
            sion of non-real-time data with respect to estimated
            remaining bandwidth needed for non-real-time data
            transmission, and add this vector as a triple (codec[i],
            best LFP, vector) to a set of feasible parameter triples.
            Memo: The following for-loop implements the "second
            pass" */
            for each feasible pair (codec[i], LFP) in
            set_of_feasible pairs
            {
                mmc_vector =
                choose_feasible_MMC_parameters
                (remaining_bandwidth);
                set_of_feasible_triples =
                set_of_feasible_triples ∪ {mmc_vector};
            }
            // Memo: The following statement stands for the "third
            pass".
            bestCombination = choose_best_triple
            (set_of_feasible_triples);
            // choose best combination, i.e., the best of feasibles
            triples (codec, LFP, mmc_vector)
            store_new_QoS_values(CONF_ID,
            bestCombination);
            /* Previous statement stores best combination as new
            QoS parameter values for CONF_ID
        }
    }// end if (tryQOS ≧ 1.1 && tryQOS ≦ 4), i.e., voice
    transmission was allowed
    else // if tryQOS > 4; note that, in this case, no codec has been
    found!
    {
        if (tryQoS = 5 // i.e., no voice transmission, and therefore
        no codec needed
        {
            store_new_QoS_values(CONF_ID, 5, Profile_Params,
            AudioGwy_Params);
            /* Previous statement computes and stores new QoS
               parameter values for CONF_ID according to QoS = 5
               and according to Profile and current AudioGateway
               parameters. */
        }
        else //tryQOS = 6, i.e., no voice transmission possible, no
        data transmission needed.
        {
            store_new_QoS_values(CONF_ID, 6, Profile_Params,
            AudioGwy_Params);
        }
        break; // while !codecFound would never stop unless broken
        in this else case, tryQOS > 4
        . . .
    }
    }// end while !codecFound
} // end AQuaVIT
```

The following documents were cited in the description above. Additional detailed information with regard to the foregoing description may be found in these publications:

[1] A. S. Tanenbaum, Computer-Netzwerke [Computer Networks], Wolframs's Fachverlag, $2^{nd}$ Edition, ISBN 3-925328-79-3, p. 17-32, 1992

[2] IETF working group, PSTN and Internet Internetworking (pint), available in the Internet on 2 Apr. 2000 at URL address: www.ietf.org/html.charters/pint-charter.html.

[3] M. Krautgärtner, H. Decker, et al., Design of V/D-API and Architecture of the VE-MASE, CEC Deliverable Number AC343/Siemens/ WP2/DS/P/02/a1, Project Number AC343, November 1998

[4] ETSI TIPHON, Telecommunications and Internet Protocol Harmonization Over Networks, General Aspects of Quality of Service (QoS), TR 101 329 V2.1.1 (1999-06), June 1999

[5] S. N. Bhatti, G. Knight "Enabling QoS Adaptations for Internet Applications", Journal of Computer Networks, Vol. 31, No. 7, p. 669-692, March 1999

[6] H. Decker, M. Krautgärtner, C. Ong, M. Wallbaum, Quality of Service Management in an Integrated Mobile Voice/Data-Enabled Service Architecture, Proceedings of the $4^{th}$ ACTS Mobile Communication Summit, Jun. 8-11, 1999, Sorrento, Italy

[7] M. Handley et al., SIP: Session Initiation Protocol, IETF Request for Comments 2543, March 1999

[8] WAP: Wireless Telephony Application Specification, available in the Internet on 2, Apr. 2000 at URL address: ww1.wapforum.org/tech/documents/SPEC-WTA-19991108.pdf

[9] H. Decker, M. Krautgärtner, Flexible Quality-of-Service Technology for Supporting Voice/Data-Integrated Nomadic Networking, in B. Chistensen-Dalsgaard, W. Donelly, M. Griffith (eds), Flexible Working—New Network Technologies, IOS Press/Ohmsha, 1999, ISBN 1 58603 028 0 (IOS Press), ISBN 4 274 90322 2 C3050 (ohmsha), Library of Congress Card Number 99-67675

We claim:

1. A method of transmitting data with real-time requirement and data without real-time requirement, which comprises:
   providing a plurality of first quality of service classes in an application layer for transmitting first data with real-time requirement and a plurality of second quality of service classes in the application layer for transmitting second data without real-time requirement, said first data with real-time requirement being of a different type from said second data without real-time requirement;
   selecting a combined quality of service class formed from the first quality of service classes and the second quality of service classes in the application layer, each combined quality of service class being allocated transmission parameters specifying a transmission of the first data and the second data; and
   supplying the first data and the second data and the transmission parameters of the selected combined quality of service class to a unit of a transport layer, and transmitting the first data and the second data with the unit taking into consideration the transmission parameters;
   wherein selecting the combined quality of service class comprises:
   a) selecting a combined quality of service class having the first quality of service class with a highest first priority and the second quality of service class with a highest second priority;
   b) checking whether a coder to be used can transmit the first data and the second data according to the transmission parameters of the respective combined quality of service class and available bandwidth;
   c) if the checking step results in an affirmative answer, selecting the combined quality of service class;
   d) if the checking step does not result in an affirmative answer, selecting a further combined quality of service class such that in each case the combined quality of service class with reduced second priority is selected; and
   e) iteratively performing steps b) and d) until the coder can transmit the first data and the second data in accordance with transmission parameters of the respective combined quality of service class.

2. The method according to claim 1, wherein the first data with real-time requirement contain voice data.

3. The method according to claim 1, wherein the second data contain data selected from the group consisting of text data, video data, and image data.

4. The method according to claim 1, which comprises allocating to each of the first quality of service classes a first priority and to each of the second quality of service classes a second priority, and specifying, based on the first and second priorities, a priority with which the first data and the second data, respectively, are to be transmitted.

5. The method according to claim 4, which comprises forming the combined quality of service classes in dependence on the first and second priorities.

6. The method of claim 1, wherein said first data is of a type including at least one of video data and audio data and said second data is of a type including text data.

7. The method according to claim 1, which comprises coding and transmitting the first data and the second data as a data stream with a predeterminable transport layer quality of service class in the unit of the transport layer.

8. A communication device for transmitting first data with real-time requirement and second data without real-time requirement, the first data with real-time requirement being of a different type from the second data without real-time requirement, wherein a plurality of first quality of service classes are provided in an application layer for transmitting the first data and a plurality of second quality of service classes are provided in the application layer for transmitting the second data, the device comprising:
   a processor selecting a combined quality of service class formed from the first quality of service classes for the first data of a first type with real-time requirement and the second quality of service classes for the second data of a second type different from said first type, said second data without real-time requirement, in the application layer, each combined quality of service class being allocated transmission parameters specifying a transmission of the first data and the second data;
   wherein selecting the combined quality of service class comprises:
   a) selecting a combined quality of service class having the first quality of service class with a highest first priority and the second quality of service class with a highest second priority;
   b) checking whether a coder to be used can transmit the first data and the second data according to the transmission parameters of the respective combined quality of service class and available bandwidth;
   c) if the checking step results in an affirmative answer, selecting the combined quality of service class;
   d) if the checking step does not result in an affirmative answer, selecting a further combined quality of service class such that in each case the combined quality of service class with reduced second priority is selected; and
   e) iteratively performing steps b) and d) until the coder can transmit the first data and the second data in accordance with transmission parameters of the respective combined quality of service class; and
   a transmission unit of a transport layer receiving from said processor the first data and the second data and the transmission parameters of the selected combined quality of service class, and transmitting the first data and the second data taking into consideration the transmission parameters.

9. The communication device according to claim 8 configured as a mobile communication device.

10. A communications system, comprising said communication device according to claim 8 configured as a first, mobile communication device, and a second communication device, wherein the first data and the second data can be transmitted from said first communication device to said second communication device.

11. The communication system of claim 10, wherein said first data is of a type including at least one of video data and audio data and said second data is of a type including text data.

12. The communication device of claim 8, wherein said first data is of a type including at least one of video data and audio data and said second data is of a type including text data.

* * * * *